(12) United States Patent
Inoue

(10) Patent No.: US 11,089,025 B2
(45) Date of Patent: Aug. 10, 2021

(54) SELECTING ENCRYPTION KEY USING POLICIES

(71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/019,266

(22) Filed: Jun. 26, 2018

(65) Prior Publication Data

US 2018/0309763 A1    Oct. 25, 2018

Related U.S. Application Data

(63) Continuation of application No. 12/934,535, filed as application No. PCT/JP2009/001299 on Mar. 24, 2009, now Pat. No. 10,033,742.

(30) Foreign Application Priority Data

Mar. 27, 2008 (JP) ................................ 2008-084102

(51) Int. Cl.
*H04L 29/06* (2006.01)
*H04W 12/02* (2009.01)
*G06F 21/00* (2013.01)

(52) U.S. Cl.
CPC ........ *H04L 63/102* (2013.01); *H04L 63/0236* (2013.01); *H04L 63/0263* (2013.01);
(Continued)

(58) Field of Classification Search
CPC ... H04L 63/102; H04L 63/0236; H04L 63/20; H04L 63/205; H04L 63/0227;
(Continued)

(56) References Cited

U.S. PATENT DOCUMENTS 6,738,909 B1 * 5/2004 Cheng ................. H04L 63/0227
  709/223
6,996,062 B1 * 2/2006 Freed ...................... H04L 45/30
  370/235

(Continued)

FOREIGN PATENT DOCUMENTS

CN    1496063 A    5/2004
CN    1848766 A    10/2006
(Continued)

OTHER PUBLICATIONS

Damianou, Nicodemos et al., "The Ponder Policy Specification Language", Department of Computing, Imperial College, 180 Queen's Gate, London SW72Bz; 2001, pp. 18-38.

(Continued)

*Primary Examiner* — Theodore C Parsons
(74) *Attorney, Agent, or Firm* — Canon U.S.A., Inc. IP Division

(57) ABSTRACT

An information processing apparatus for selecting encryption key using policy. The information processing apparatus includes at least one processor executes instructions to input a first policy which defines a first encryption key configured to be used in communication between the information processing apparatus and plural communication apparatuses and a second policy which defines a second encryption key configured to be used in communication between the information processing apparatus and a single communication apparatus.

15 Claims, 25 Drawing Sheets

(52) U.S. Cl.
CPC .......... *H04L 63/20* (2013.01); *H04L 63/205* (2013.01); *G06F 21/00* (2013.01); *H04L 63/164* (2013.01); *H04W 12/02* (2013.01)

(58) Field of Classification Search
CPC . H04L 63/0263; H04L 63/029; H04L 63/164; H04L 63/06; H04L 63/061; H04L 63/065; H04L 63/104; H04L 9/08; H04L 9/0833; G06F 21/602; G06F 21/604; G06F 21/606; G06F 21/00; H04W 12/02; H04W 12/04
See application file for complete search history.

(56) References Cited

U.S. PATENT DOCUMENTS

| | | | |
|---|---|---|---|
| 2002/0078341 | A1 | 6/2002 | Genty |
| 2004/0093524 | A1 | 5/2004 | Sakai |
| 2006/0250644 | A1* | 11/2006 | Yamauchi ............... G06F 21/62 358/1.15 |
| 2007/0019657 | A1 | 1/2007 | Takayama |
| 2007/0179899 | A1* | 8/2007 | Hase ...................... G06Q 10/10 705/59 |
| 2007/0248085 | A1* | 10/2007 | Volpano ............ H04L 29/12028 370/389 |

FOREIGN PATENT DOCUMENTS

| | | |
|---|---|---|
| CN | 1855847 A | 11/2006 |
| EP | 1484885 A2 | 12/2004 |
| JP | 2003-333084 A | 11/2003 |
| JP | 2004-104542 A | 4/2004 |
| JP | 2005-267658 A | 9/2005 |
| JP | 2006-178792 A | 7/2006 |
| JP | 2006-313495 A | 11/2006 |
| JP | 2007-323553 A | 12/2007 |

OTHER PUBLICATIONS

Koichi Kato & Yoshimi Teshigawara, "A Study on an Automatic Negotiation Method for Users' Requests Considering Dependent Relations among Negotiation Parameters", Graduate School of Engineering, Soka University, 2005, pp. 1-6.

Nobutoshi Abe et al., "Evaluation of a Proposed Traffic Management Method on the ALL-IP network in Next-generation Mobile Communications", M-024, 2004, pp. 1-7.

Nagata, Kazuhiko et al., "Architecture of High-reliability and High-performance Network-based Firewall for Always-on Internet Access Service", Institute of Electronics, Information and Communication Engineers, 2003, pp. 1-15.

Nobutoshi Abe et al.; "LTE-Advanced Scenarios for Macros+HeNB and Macro+Pico;" Forum on Information Technology 2004, vol. 4, pp. 139-140, Aug. 20, 2004.

* cited by examiner

FIG. 9

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |
| 3 | c | ALL IP ADDRESSES | 80 | ALL IP ADDRESSES | ALL PORTS | ccc |
| 4 | d | ALL IP ADDRESSES | 9100 | ALL IP ADDRESSES | ALL PORTS | ccc |

FIG. 10

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |
| 3 | e | ALL IP ADDRESSES | ALL PORTS | 192.168.1.3 | ALL PORTS | bbb |
| 4 | c | ALL IP ADDRESSES | 80 | ALL IP ADDRESSES | ALL PORTS | ccc |
| 5 | d | ALL IP ADDRESSES | 9100 | ALL IP ADDRESSES | ALL PORTS | ccc |

FIG. 13

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |
| 3 | c | ALL IP ADDRESSES | 80 | ALL IP ADDRESSES | ALL PORTS | ccc |
| 4 | d | ALL IP ADDRESSES | 9100 | ALL IP ADDRESSES | ALL PORTS | ccc |

FIG. 14

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |
| 3 | c | ALL IP ADDRESSES | 80 | ALL IP ADDRESSES | ALL PORTS | ccc |
| 4 | d | ALL IP ADDRESSES | 9100 | ALL IP ADDRESSES | ALL PORTS | ccc |
| 5 | e | ALL IP ADDRESSES | 515 | ALL IP ADDRESSES | ALL PORTS | ccc |

FIG. 15

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |
| 3 | c | ALL IP ADDRESSES | 80 | ALL IP ADDRESSES | ALL PORTS | eee |
| 4 | d | ALL IP ADDRESSES | 9100 | ALL IP ADDRESSES | ALL PORTS | eee |
| 5 | e | ALL IP ADDRESSES | 515 | ALL IP ADDRESSES | ALL PORTS | eee |

FIG. 17

ORDER OF PRIORITY OF THIS POLICY
CANNOT BE CHANGED TO SPECIFIED
ORDER OF PRIORITY.

FIG. 18

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |
| 3 | c | ALL IP ADDRESSES | 80 | ALL IP ADDRESSES | ALL PORTS | ccc |
| 4 | d | ALL IP ADDRESSES | 9100 | ALL IP ADDRESSES | ALL PORTS | ccc |

FIG. 19

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |
| 3 | d | ALL IP ADDRESSES | 9100 | ALL IP ADDRESSES | ALL PORTS | ccc |
| 4 | c | ALL IP ADDRESSES | 80 | ALL IP ADDRESSES | ALL PORTS | ccc |

FIG. 20

Prior Art

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | 192.168.1.1 | ALL PORTS | aaa |
| 2 | b | ALL IP ADDRESSES | ALL PORTS | 192.168.1.2 | ALL PORTS | bbb |

FIG. 21

Prior Art

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | c | ALL IP ADDRESSES | ALL PORTS | ALL IP ADDRESSES | ALL PORTS | ccc |

FIG. 22
Prior Art

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | b | ALL IP ADDRESSES | ALL PORTS | 192.168.1.2 | ALL PORTS | bbb |
| 2 | c | ALL IP ADDRESSES | ALL PORTS | ALL IP ADDRESSES | ALL PORTS | ccc |

FIG. 23

Prior Art

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | ALL PORTS | ALL IP ADDRESSES | ALL PORTS | aaa |
| 2 | b | ALL IP ADDRESSES | ALL PORTS | 192.168.1.1 | ALL PORTS | bbb |

FIG. 24

Prior Art

| ORDER OF PRIORITY | NAME | LOCAL ADDRESS | LOCAL PORT | REMOTE ADDRESS | REMOTE PORT | COMMON KEY |
|---|---|---|---|---|---|---|
| 1 | a | ALL IP ADDRESSES | 80 | ALL IP ADDRESSES | ALL PORTS | aaa |
| 2 | b | ALL IP ADDRESSES | 9100 | ALL IP ADDRESSES | ALL PORTS | bbb |

FIG. 25

| DIRECTORY INFORMATION |
|---|
| PROGRAM CODE GROUP CORRESPONDING TO STEPS OF FLOWCHART OF FIG. 8 |
| PROGRAM CODE GROUP CORRESPONDING TO STEPS OF FLOWCHART OF FIG. 11 |
| PROGRAM CODE GROUP CORRESPONDING TO STEPS OF FLOWCHART OF FIG. 16 |

SELECTING ENCRYPTION KEY USING POLICIES

CROSS-REFERENCE TO RELATED APPLICATION

This application is a Continuation of co-pending U.S. patent application Ser. No. 12/934,535 filed Sep. 24, 2010, which is a National Phase Applications of International Application PCT/JP2009/001299, filed Mar. 24, 2009, which claims the benefit of Japanese Patent Application No. 2008-084102, filed Mar. 27, 2008. The disclosures of the above-named applications are hereby incorporated by reference herein in their entirety.

TECHNICAL FIELD

The present invention relates to an information processing apparatus, a control method of the information processing apparatus, a storage medium, and a program.

BACKGROUND ART

Hitherto, an information processing apparatus that performs communication using Security Architecture for Internet Protocol (IPSec) is known. The IPSec is widely used in an application that operates in an Internet Protocol (IP) layer and in a higher order than the IP layer. Communications making use of the IPSec requires setting of pieces of policy information. FIG. 20 shows an example of a setting operation regarding the IPSec. When setting the pieces of policy information, it is necessary to set order of priority, name, local address (address of one's apparatus), local port (port of one's apparatus), remote address (address of communication partner), remote port (port of communication partner), and common key. Policy information "a" shown in FIG. 20 indicates that, regarding an IPSec negotiation request from a communication partner corresponding to address "192.168.1.1," communication of data that is transmitted or received is performed using a common key "aaa" even if the communication is one in which any port of one's apparatus is specified.

Policy information "b" indicates that, regarding an IPSec negotiation request from a communication partner corresponding to address "192.168.1.2," communication with data that is transmitted or received is performed using a common key "bbb" even if the communication is one in which any port of one's apparatus is specified.

The communication can be performed using common keys that are different for personal computers (PCs) by setting one common key for one communication partner that is specified by a single address.

The policy information in the IPSec communication is given an order of priority. The information processing apparatus determines the policy information to be used in accordance with the order of priority. For example, a policy information list, such as that shown in FIG. 20, is registered in the information processing apparatus. The case in which an IPSec negotiation request is made from the communication partner corresponding to the address "192.168.1.2" will be described. In this case, from the policy information having a higher order of priority, the information processing apparatus searches for the policy information in which "192.168.1.2" is set as the remote address. More specifically, starting from the policy information having an order of priority of "1" in the policy information list, the information processing apparatus compares in turns the address of the communication partner whose has sent a request for IPSec negotiation with the remote address in the policy information list, and searches for the policy information that matches therewith. When the policy information list shown in FIG. 20 is registered in the information processing apparatus, the information processing information first refers to the policy information "a" having an order of priority of 1. However, since the policy information "a" is not set to the remote address "192.168.1.2," the information processing apparatus subsequently refers to policy information "b" having a second highest order of priority of 2. Since a remote address of the policy information "b" is set to "192.168.1.2," the information processing apparatus starts communication with the communication partner using the common key "bbb" in the policy information having an order of priority of 2. At this time, even for the apparatus of the communication partner, if a setting is performed so that the common key "bbb" is used in the communication with one's apparatus, it is possible to decode data that is transmitted from the apparatus of the communication partner with the same common key, to normally decode the data. In addition, if a common key used in the apparatus of the communication partner and the common key used do not match with that of one's apparatus, the data that is received from the apparatus of the communication partner cannot be decoded. Accordingly, in the communication using IPSec, security is provided by making it possible to perform communication only between apparatuses that are set so that communication is performed using the same common key.

However, when one wants to set the same common key with respect to a plurality of communication partners, it is necessary to set pieces of policy information in correspondence with the number of apparatuses of the communication partners. This burdens a user.

Therefore, an information processing apparatus which can register policy information shown in FIG. 21 is available. As regards an IPSec negotiation request from communication partners corresponding all addresses, policy information "c" shown in FIG. 21 indicates that communication with data that is transmitted or received is performed using a common key "ccc" even if the communication is one in which any port of one's apparatus is specified.

Accordingly, it is possible to set a common key with respect to apparatuses of communication partners by one setting performed by a user when policy information in which a plurality of addresses are specified for a remote address of one piece of policy information is set.

As shown in FIG. 22, it is possible to register both policy information in which one address is set for a remote address and policy information in which a plurality of addresses is set for the remote address. A policy information list shown in FIG. 22 indicates that, in communicating with an apparatus corresponding to "192.168.1.2," the communication is performed using a common key "bbb," whereas, in communicating with an apparatus corresponding to an address other than the aforementioned address, the communication is performed using a common key "ccc." Accordingly, by registering in the policy information list the policy information in which a single address is set for the remote address and the policy information in which a plurality of addresses are set for the remote address, the policy information can be flexibly recorded.

However, when the policy information in which a single address is set for the remote address and the policy information in which a plurality of addresses are set for the remote address are both registered in the policy information list, it may not be possible to perform normal communication with an apparatus of a communication partner depending upon the way the policy information is registered.

For example, it is assumed that a policy information list, such as that shown in FIG. 23, is registered in the information processing apparatus, which is one's apparatus. In addition, it is assumed that an IPSec negotiation request is sent from an apparatus of a communication partner (address "192.168.1.1") that is set so that communication with the information processing apparatus is performed using a common key "bbb." Here, the communication with the apparatus of the communication partner should be performed using policy information "b" in which the common key "bbb" is set. However, since the information processing apparatus searches for the remote address from the policy information having a high order of priority, the information processing apparatus starts the communication with the apparatus of the communication partner using policy information "a." In this case, in the process of performing the communication, one's apparatus performs the communication using a common key "aaa," whereas the apparatus of the communication partner performs the communication using the common key "bbb." Therefore, the communication is unsuccessfully performed due to mismatching of attributes included in the pieces of policy information.

Even if a policy information list, such as that shown in FIG. 24, is registered in the information processing apparatus, which is one's apparatus, the communication may be unsuccessfully performed. It is assumed that an IPSec negotiation request which specifies a port number 9100 is given from an apparatus of a communication partner which is set so as to use a common key "bbb" in the communication with the information processing apparatus. Here, although, policy information "b" in which the common key "bbb" is set in the communication with the apparatus of the communication partner should be used, since the information processing apparatus, which is one's apparatus, searches for a remote address from policy information having a high order of priority, the information processing apparatus starts the communication using policy information "a."

In this case, in the process of performing the communication, one's apparatus performs the communication using common key "aaa," whereas the apparatus of the communication partner performs the communication using the common key "bbb." Therefore, the communication is unsuccessfully performed due to mismatching of attributes included in the pieces of policy information.

For preventing such unsuccessful communication, a user needs to register policy information considering the order of priority. This burdens the user when performing the setting operation.

In view of the above-described problem, the present invention makes it possible to prevent unsuccessful communication, caused by mismatching of attributes included in pieces of policy information resulting from how the pieces of policy information are registered, without having to burden a user with registering pieces of policy information considering the order of priority.

DISCLOSURE OF INVENTION

The present invention provides an information processing apparatus and a control method of the information processing apparatus, which overcome the above-described problem.

The present invention provides an information processing apparatus including a registering unit configured to register pieces of policy information in a storage unit in accordance with an order of priority thereof, the pieces of policy information each including at least an address of an apparatus of a communication partner and key information used for communication with the apparatus of the communication partner; a selecting unit configured to select from the storage unit any policy information to be used for the communication with the apparatus of the communication partner in accordance with the order of priority of the pieces of policy information; and a control unit configured to restrict, in a case where an address of an apparatus of a communication partner of policy information to be registered by the registering unit is included in an address of an apparatus of a communication partner of policy information already registered in the storage unit, registering of the policy information to be registered so that an order of priority of the policy information to be registered is set lower than an order of priority of the policy information whose address includes the address of the apparatus of the communication partner of the policy information to be registered.

Other features of the present invention will become apparent from, for example, the following specification and drawings.

BRIEF DESCRIPTION OF DRAWINGS

The accompanying drawings, which are incorporated in and constitute apart of the specification, illustrate embodiments of the present invention and, together with the description, serve to explain the principle of the invention.

FIG. 9 shows a policy information list according to the present invention.

FIG. 10 shows another policy information list according to the present invention.

FIG. 13 shows a policy information list according to the present invention.

FIG. 14 shows another policy information list according to the present invention.

FIG. 15 shows still another policy information list according to the present invention.

FIG. 17 illustrates an exemplary display screen according to the present invention.

FIG. 18 shows a policy information list according to the present invention.

FIG. 19 shows another policy information list according to the present invention.

FIG. 20 shows still another policy information list according to the present invention.

FIG. 21 shows still another policy information list according to the present invention.

FIG. 22 shows still another policy information list according to the present invention.

FIG. 23 shows still another policy information list according to the present invention.

FIG. 24 shows still another policy information list according to the present invention.

FIG. 25 illustrates program code groups according to the present invention.

DESCRIPTION OF EMBODIMENTS

First Embodiment

Figure 1:
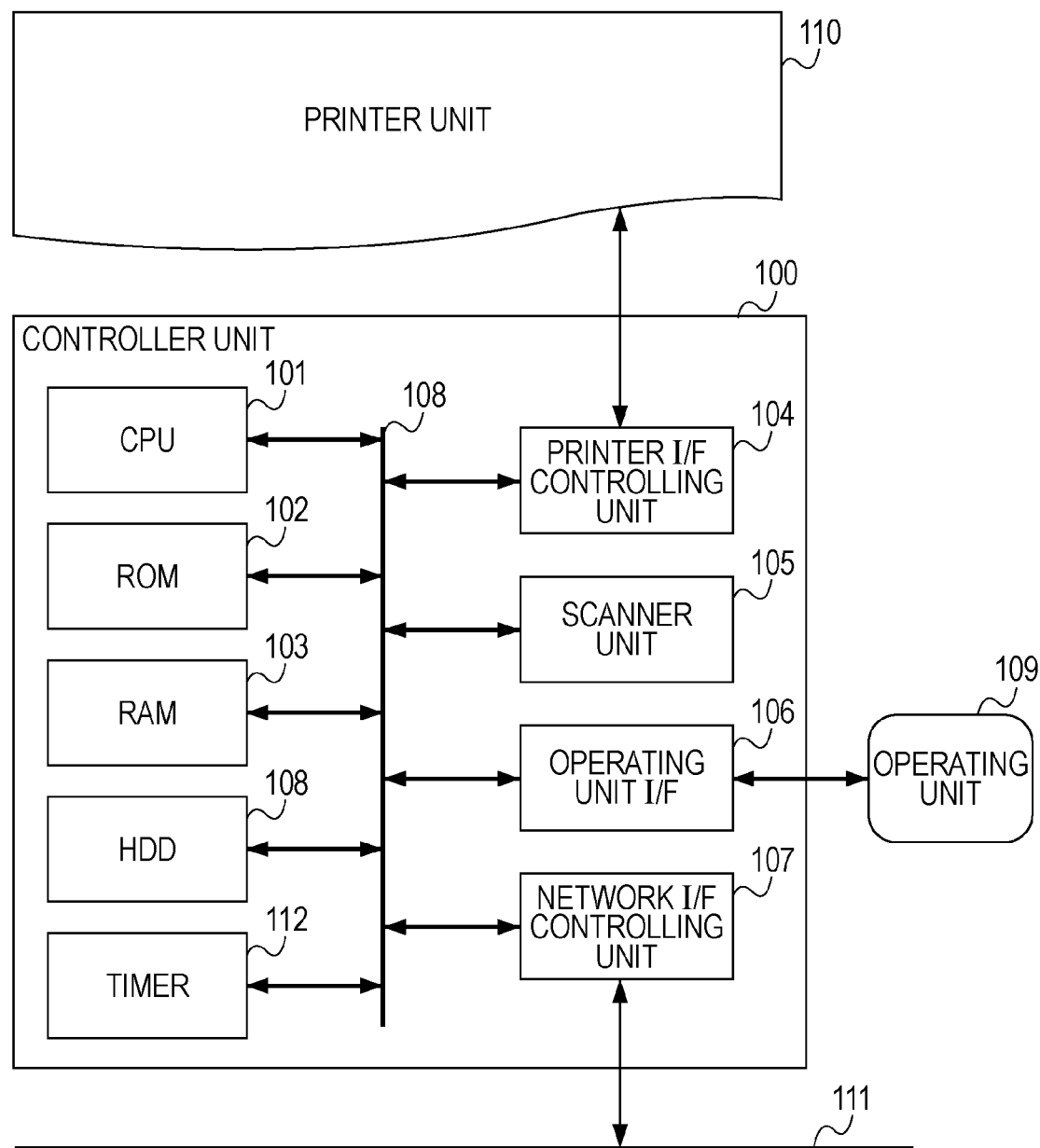
FIG. 1 shows the structure of hardware according to an embodiment of the present invention.

FIG. 1 is a block diagram of the structure of hardware of a Multifunction Peripheral (MFP) 100, which is an exemplary information processing apparatus according to a first embodiment of the present invention. The MFP includes a controller unit 100, a printer unit 110, and an operating unit 109.

A central processing unit (CPU) 101 executes a program stored in ROM 102, and performs overall control of the operations of the MFP.

ROM 102 is a read-only memory, and stores various programs read out by the CPU 101. For example, ROM 102 stores, for example, fixed parameters or boot programs of the apparatus.

RAM 103 is a random-access memory, and is used as a work memory of the CPU 101.

A printer I/F (interface) controlling unit 104 is an interface used when the CPU 101 controls the printer unit 110. The CPU 101 transmits a command to the printer unit 110 through the printer I/F controlling unit 104, and causes the printer unit 110 to operate in accordance with the transmitted command.

A scanner unit 105 reads an image of an original, and generates image data indicating the read image. The CPU 101 causes an HDD 108 to store the image data generated by the scanner unit 105. In addition, in accordance with an instruction from a user, the CPU 101 causes the printer unit to perform a printing operation, and transmits the image data to an external information processing apparatus through LAN 111.

A panel controlling unit 106 is used when the CPU 101 controls the operating unit 109. The operating unit 109 includes a liquid crystal display and a touch panel and various operation keys. The CPU 101 transmits display data to the operating unit 109 through an operation controlling unit 106, and causes the liquid crystal display of the operating unit 109 to perform a screen-display operation. The CPU 101 receives an instruction from the user by the touch panel of the operating unit 109, and receives a received setting through the operation controlling unit 106.

A network I/F controlling unit 107 is an interface used when the CPU 101 transmits and receives data through the LAN 111. For example, the CPU 101 communicates with an external information processing apparatus connected through the LAN 111.

The HDD 108 is a hard disk drive, and stores the image data read from the scanner unit 105. The HDD 108 stores the image data received through the LAN 111. In addition, the CPU 101 can associate the received data with a print setting set by the user at an external information processing apparatus or the operating unit 109, and store it in the HDD 108.

A timer 112 controls time, and provides time data on the basis of an instruction from the CPU 101.

Each of the above-described structural parts is connected to each other by a bus 108, and a command or data is transferred through the bus 108.

Figure 2:
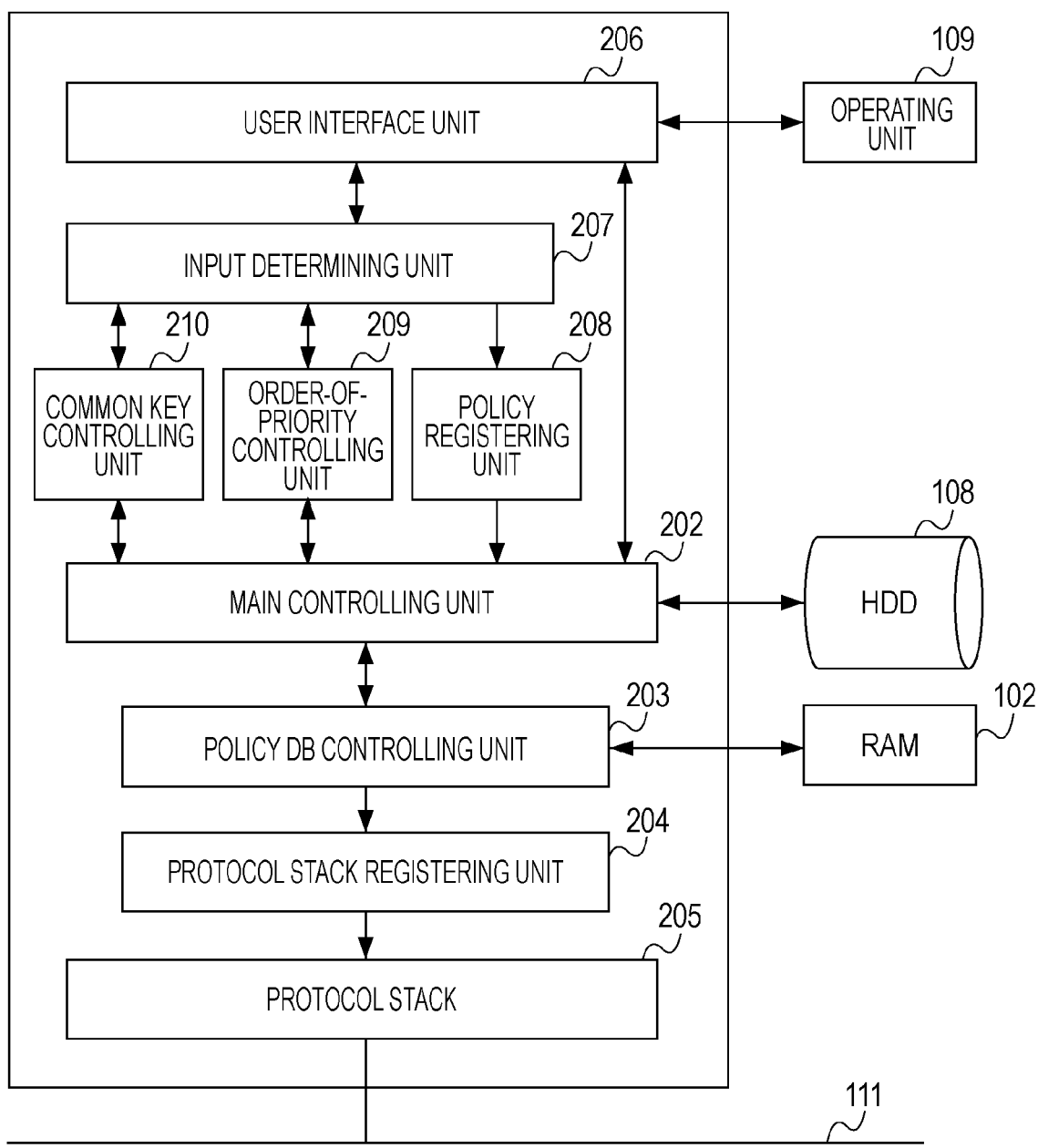
FIG. 2 shows the structure of hardware according to the embodiment of the present invention.

FIG. 2 is a block diagram of the structure of the software of the MFP according to the first embodiment of the present invention. Although, in the embodiment, the HDD 108 is used as an example of a nonvolatile memory, when the MFP includes a nonvolatile RAM (NVRAM), a storage device 201 may be a nonvolatile RAM.

A main controlling unit 202, a policy database (DB) controlling unit 203, a protocol stack registering unit 204, a protocol stack 205, and a user interface unit 206 function when the CPU 101 executes a program stored in ROM 102. An input determining unit 207, a policy registering unit 208, an order-of-priority controlling unit 209, and a common key controlling unit 210 also function when the CPU executes a program stored in ROM 102.

The main controlling unit 202 reads out policy information from the storage device 201, and writes the policy information to RAM 102 through the policy DB controlling unit 203. When a request is made from the user interface unit 206 to the operating unit 109 to display the policy information, the main controlling unit 202 causes the information read out through the policy DB controlling unit 203 to be transferred to the user interface unit 206.

The policy DB controlling unit 203 stores in RAM 102 as a policy information list the policy information read out from the storage device 201 by the main controlling unit 202 during start-up of the MFP, and controls it. In addition, during communication, the policy DB controlling unit 203 obtains policy information of RAM 102, and transfers the obtained policy information to the protocol stack registering unit 204.

The protocol stack registering unit 204 performs control so as to obtain policy information from the policy DB controlling unit 203, and to make effective IPSec policy in the protocol stack.

In accordance with the IPSec policy made effective by the protocol stack registering unit 204, the protocol stack 205 transmits and receives packet data at the LAN 111 through a network driver. In addition, in accordance with the IPSec policy, the protocol stack 205 encrypts and decrypts the packet data.

When the user interface unit 206 receives a request for displaying the policy information list from the operating unit 109, the request is transmitted to the main controlling unit 202. The main controlling unit 202 transfers to the user interface unit 206 the policy information list stored in RAM 102 through the policy DB controlling unit 203, and the user interface unit 206 displays the policy information at the operating unit 109. When a request for, for example, new registering, editing, or deleting of the policy is received through the operating unit 109, the user interface unit 206 transfers the request to the input determining unit 207 or the main controlling unit 202, and the input determining unit 207 or the main controlling unit 202 performs control in accordance with the request.

The input determining unit 207 checks an attribute value included in policy information input by the user interface unit 206, and determines whether or not this reflects restrictions for when the policy information is registered. On the basis of the determined result, the input determining unit 207 transfers the input policy information to any one of the policy registering unit 208, the order-of-priority controlling unit 209, and the common key controlling unit 210.

In accordance with the request input from the operating unit 109 through the user interface unit 206, the policy registering unit 208 transfers a request for writing the policy information in RAM 102 to the policy DB controlling unit 203 through the main controlling unit 202. In accordance with the transferred request, the policy DB controlling unit 203 writes the policy information to RAM 102. In accordance with the request input from the operating unit 109 through the user interface unit 206, the policy registering unit 208 also performs control so that the policy information stored in RAM 102 is changed or deleted. When the policy information is to be changed or deleted, the policy registering unit 208 transfers a request for changing or deleting the policy information stored in RAM 102 to the policy DB controlling unit 203 through the main controlling unit 202. In accordance with the transferred request, the policy DB controlling unit 203 changes or deletes the policy information stored in RAM 102.

When the input determining unit 207 determines that the policy information input from the user interface unit 206 reflects the restrictions for when the policy information is registered, the order-of-priority controlling unit 209 performs control so that the order of priority of the input policy information is a suitable order of priority. When it is necessary to change the order of priority of the policy information already registered in RAM 102 due to the determination of the order of priority of the input policy information, the order-of-priority controlling unit 209 changes the order of priority of the policy information already registered in RAM 102.

When the input determining unit 207 determines that a common key of the input information reflects the restrictions for when the policy information is registered, the common key controlling unit 210 performs the following control. That is, the common key controlling unit 210 performs the control for changing the common key of the input policy information or the policy information already registered in RAM 102.

Although, in the embodiment, the policy DB controlling unit 203 controls the policy information list in RAM 102, it may control policy information in the HDD 108.

FIGS. 3 to 6 show exemplary user interfaces for registering policy information in the embodiment. They are provided at the operating unit 109. In FIGS. 3 to 6, setting may be performed so that connection is made to the MFP from an external computer terminal connected through the LAN 111.

Figure 3:
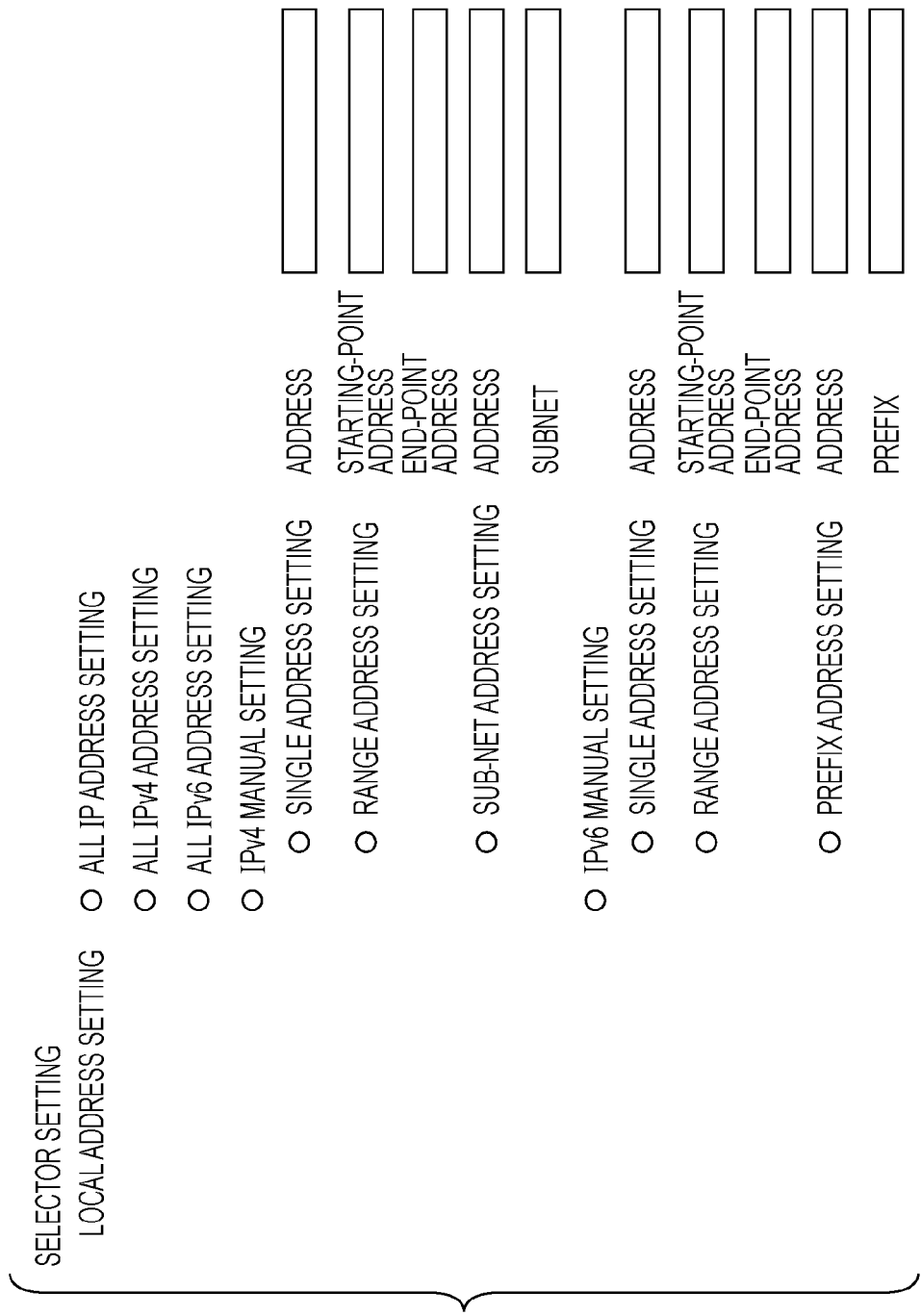
FIG. 3 illustrates an exemplary display screen according to the present invention.

FIG. 3 is an exemplary local address setting of policy information. Address information of one's apparatus is set.

The user can select one predetermined setting from the local address settings, that is, from "all IP addresses," "all IPv4 addresses," "all IPv6 addresses," "IPv4 manual setting," and "IPv6 manual setting." The local address is an address of one's apparatus when performing communication. When the "IPv4 manual setting" is selected, the user further selects one specification from "single address specification," "range address specification," and "sub-net address specification." When the "single address specification" is selected, a particular IPv4 address is specified. When the "range address specification" is selected, a starting-point address and an end-point address are selected. When the "sub-net address specification" is selected, an address and a sub-net mask are specified. When the "IPv6 manual setting" is selected, one specification is further selected from "single address specification," "range address specification," and "prefix specification." When the "single address specification" is selected, a particular address IPv6 is specified. When the "range address specification" is selected, a starting-point address or an end-point address are specified. When the "prefix specification" is selected, an address and a prefix length are specified. In the embodiment, the settings other than the "single address specification" are called "plurality-of-addresses specification."

Figure 4:
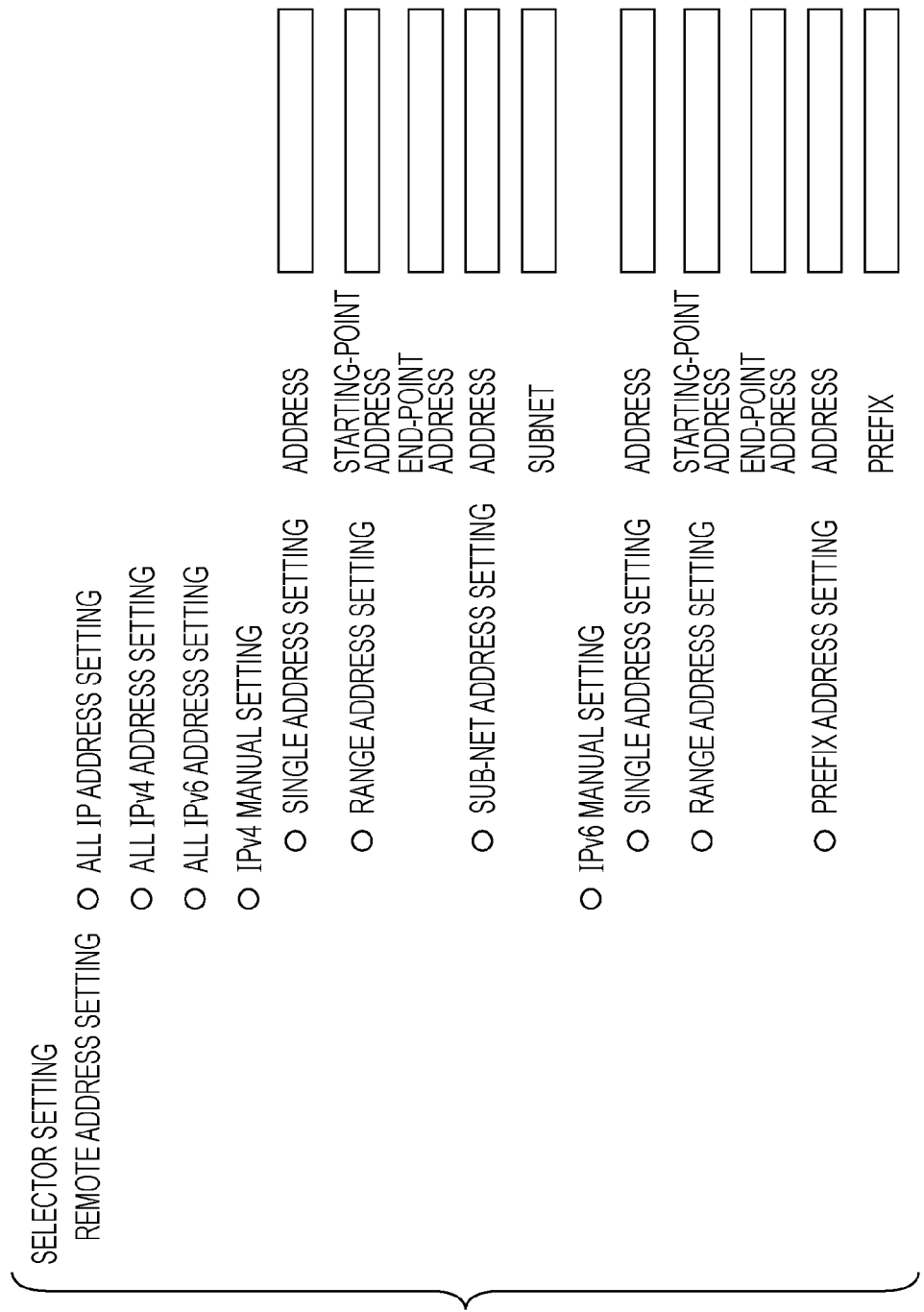
FIG. 4 illustrates another exemplary display screen according to the present invention.

FIG. 4 is an exemplary user interface for performing remote address setting of policy information. Address information of an apparatus of a communication partner to which one wants to perform IPSec communication is set. Remote address is an address of the communication partner. The user can select one predetermined setting from "all IP addresses," "all IPv4 addresses," "all IPv6 addresses," "IPv4 manual setting," and "IPv6 manual setting." When the "IPv4 manual setting" is selected, the user further selects one specification from "single address specification," "range address specification," and "sub-net address specification." When the "single address specification" is selected, a particular IPv4 address is specified. When the "range address specification" is selected, a starting-point address and an end-point address are specified. When the "sub-net address specification" is selected, an address and a sub-net mask are specified. When the "IPv6 manual setting" is selected, one specification is further selected from "single address specification," "range address specification," and "prefix specification." When the "single address specification" is selected, a particular address IPv6 is specified. When the "range address specification" is selected, a starting-point address or an end-point address are specified. When the "prefix specification" is selected, an address and a prefix length are specified. In the embodiment, the settings other than the "single address specification" are called "plurality-of-addresses specification."

Figure 5:
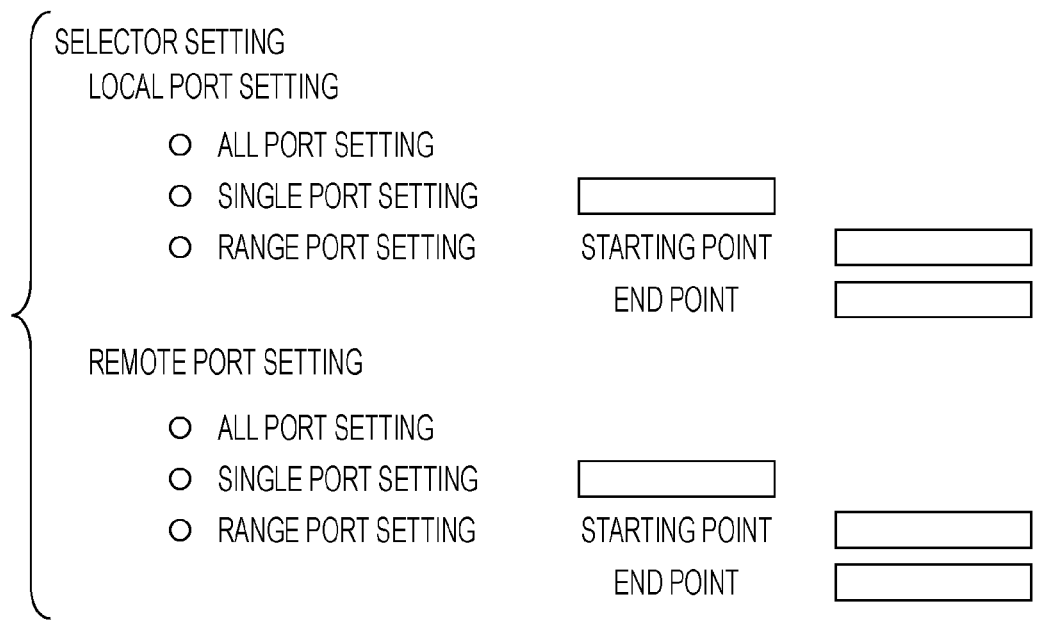
FIG. 5 illustrates still another exemplary display screen according to the present invention.

FIG. 5 is an exemplary user interface for setting a port number of policy information. The user selects which port to use among ports of one's apparatus during IPSec communication from local port settings. In addition, from remote port settings, the user selects with which port of a host of the communication partner IPSec communication is to be performed. One local port setting is selected from "all ports setting," "single port setting," and "range port setting." The local port settings are related to the ports of one's apparatus for when communication is performed. When the "single port setting" is selected, a particular port number is specified. When the "range port setting" is selected, a starting-point port and an end-point port are specified. One remote port setting is selected from "all ports setting," "single port setting," and "range port setting." When the "single port setting" is selected, a particular port number is specified. When the "range port setting" is selected, a starting-point number and an end-point number are specified. The remote port settings are settings related to ports of the communication partner for when communication is performed.

Figure 6:
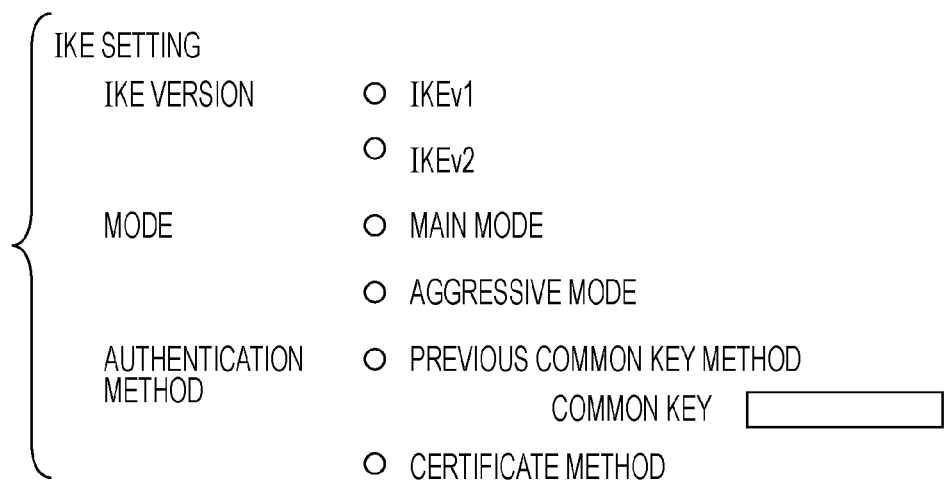
FIG. 6 illustrates still another exemplary display screen according to the present invention.

FIG. 6 is an exemplary user interface for performing setting related to policy Internet Key Exchange (IKE). One IKE version to be used is selected from "1" and "2." One connection mode is selected from "main mode" and "aggressive mode." One authentication method is selected from "previous common key method" or "certificate method." When the "previous common key method" is selected, a common key that is the same as that of the communication partner is set. When the "certificate method" is selected, any certificate is selected.

Figure 7:
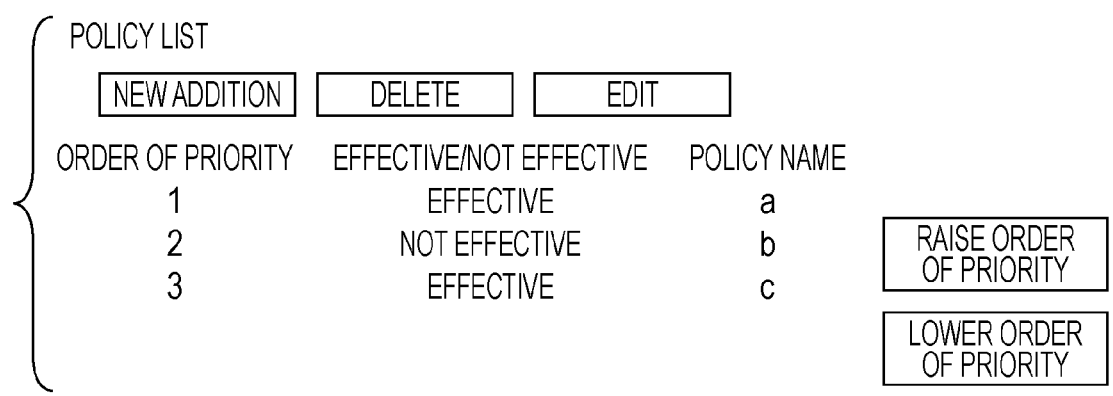
FIG. 7 illustrates still another exemplary display screen according to the present invention.

FIG. 7 is an exemplary user interface for new registering, deleting, and editing of policy information in a policy information list registered in RAM 102. In FIG. 7, the policy information registered in RAM 102 at the present time is displayed. When the user makes a request for display of the policy information through the operating unit 109, the user interface unit 206 transfers a request for obtaining the policy information list to the main controlling unit 202. Then, the main controlling unit 202 obtains the policy information list from RAM 102 through the policy DB controlling unit 203, and transfers the policy information list to the user interface unit 206. The user interface unit 206 displays the transferred policy information list at the operating unit 109.

At the screen shown in FIG. 7 when the user wants to register new policy information, the user presses a "new register" button. When the user wants to change the already registered policy information, the user selects predetermined policy information, and presses an "edit" button. When the user wants to delete the already registered policy, the user selects predetermined policy information, and presses a "delete key." If the user wants to change the order of priority of the already registered information, when the user selects predetermined policy information and is to raise the order of priority, the user presses a "raise priority" button, whereas, when the user is to lower the order of priority, the user presses a "lower priority" button.

Next, an operation for preventing unsuccessful communication due to mismatching of attributes included in pieces of policy information even if the policy information having a single address set for the remote address of the policy information and the policy information having a plurality of addresses set from the remote address are both registered in the policy information list will be described. By such an operation, it is possible to prevent an unsuccessful communication occurring when the policy information list shown in FIG. 24 is registered.

Figure 8:
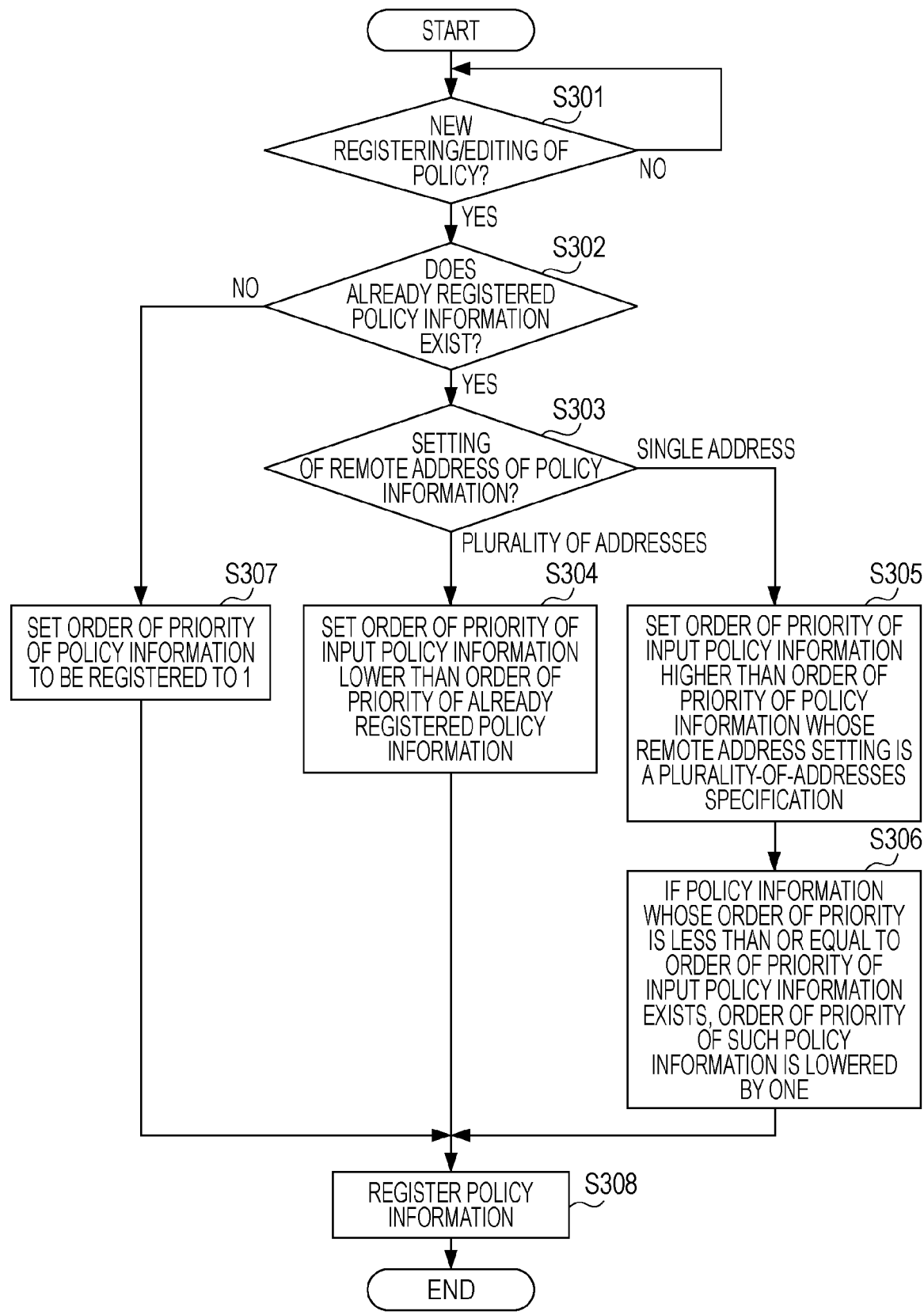
FIG. 8 is a flowchart according to a first embodiment of the present invention.

FIG. 8 is a flowchart of procedural steps according to the first embodiment. The steps in the flowchart shown in FIG. 8 are performed when the CPU 101 executes a program stored in ROM 102, and causes the various portions of the structure of the software shown in FIG. 2 to function.

In Step S301, the user interface unit 206 determines whether or not an instruction regarding policy information is received from a user through the operating unit 109. When the user interface unit 206 determines that an instruction regarding policy information is received, it transfers the instruction regarding the policy information input by the user to the input determining unit 207. The input determining unit 207 determines whether the instruction regarding the policy information transferred from the user interface unit 206 is for new registering of policy information or editing (changing or deleting) the policy information already registered in RAM 102. When the input determining unit 207 determines that the instruction is for new registering of policy information or the editing of the policy information already registered in RAM 102, the process proceeds to Step S302. When the input determining unit 207 determines that the instruction is not for new registering of policy information or the editing of the already exiting policy information, Step S301 is repeated.

In Step S302, the input determining unit 207 sends an inquiry to the main controlling unit 202 regarding whether the policy information is already existing policy information. When the MFP is initialized, the main controlling unit 202 reads out the policy information stored in the HDD 108, transfers the read out policy information to the policy DB controlling unit 203, and causes the read out policy information to be written to RAM 102. With regard to the inquiry from the input determining unit 207, the main controlling unit 202 refers to the policy information written to RAM 102, and determines whether or not the policy information is already existing policy information. Instead of through the main controlling unit 202, the input determining unit 207 may refer directly to the policy information in RAM 102 and determine whether or not the policy information is already existing policy information.

When, in Step S302, the input determining unit 207 determines that the already exiting policy information does not exist, the process proceeds to Step S307 to set the order of priority of the input policy information to 1, and information indicating the order of priority and the policy information is transferred to the policy registering unit 208. Then, in Step S308, in accordance with the information indicating the order of priority, the policy registering unit 208 registers the transferred policy information in the policy information list stored in RAM 102 through the main controlling unit 202 and the policy DB controlling unit 203. When the policy information is registered in the policy information list, the main controlling unit 202 causes a policy information list for after the policy information is registered to be written to the HDD 108, and ends the registering of the policy information.

When, in Step S302, the input determining unit 207 determines that the policy information already registered in RAM 102 exists, the process proceeds to Step S303. In Step S303, the input determining unit 207 determines whether a remote address setting of the input policy information is a single address specification or a plurality-of-addresses specification. The single address specification means that one address, such as "192.168.1.1" or "192.168.1.2," is specified. The plurality-of-addresses specification means that a plurality of addresses, such as "all IP addresses" or "192.168.1.1/255.255.0.0" are specified. Although, in the embodiment, the "all IP addresses" is used in an example for the method of specifying a plurality of addresses, it is possible to specify "192.168.1.1/255.255.0.0" using a subnet mask.

When, in Step S303, the input determining unit determines that the remote address setting of the input policy information is the "plurality-of-addresses specification," the process proceeds to Step S304. In Step S304, the input determining unit 207 transfers the input policy information to the policy registering unit 208. Through the main controlling unit 202, the policy registering unit 208 refers to the order of priority of the policy information registered in the policy information list, and determines the order of priority so that the order of priority of the input policy information is lower than the policy information registered in the policy information list. Then, in Step S308, the policy registering unit 208 registers the input policy information in the policy information list in RAM 102 through the main controlling unit 202.

In contrast, when, in Step S303, the input determining unit 207 determines that the remote address setting of the input policy information is the single address specification, the process proceeds to Step S305. In Step S305, the order-of-priority controlling unit 209 is requested by the input determining unit 207 to determine the order of priority of the input policy information. The order-of-priority controlling unit 209 refers to the policy information list stored in RAM 102 through the main controlling unit 202 and the policy DB controlling unit 203. Then, the order-of-priority controlling unit 209 determines the order of priority of the input policy information so that the order of priority of the remote address of the already existing policy information list is lower than the order of priority of the policy information in which a single address is specified, and is higher than the order of priority of the policy information in which a plurality of addresses are specified. Then, the process proceeds to Step S306. If policy information having an order of priority that is the same as or lower than the order of priority of the input policy information exists in the policy information list in RAM 102, the order of priority of such policy information is lowered by one. In Step S308, in accordance with the order of priority determined by the order-of-priority controlling unit 209 in step S305, the policy registering unit 208 registers the input policy information in the policy information list in RAM 102 through the policy DB controlling unit 203. When the registering of the input policy information is completed, the main controlling unit 202 reads out the policy information list stored in RAM 102 through the policy DB controlling unit 203, writes the policy information list to the HDD 108, and ends the registering of the policy information.

Next, the registering of the policy information to the policy information list will be described with reference to specific examples.

For example, pieces of policy information, such as that shown in FIG. 9, is already registered in the policy information list in RAM 102. Policy information a indicates that, when an IPSec negotiation request is made from a communication partner corresponding to the address "192.168.1.1," communication with a common key "aaa" is performed using data that is transmitted or received even if the communication is one in which any port of one's apparatus is specified.

The case in which policy information having the following content is registered in the policy information list will be described.

Policy Name: "e"
Local Address Setting: "all IP addresses"
Local Port Setting: "all ports"
Remote Address Setting: "192.168.1.3"
Remote Port Setting: "all ports"
Common Key Setting: "eee"

In this case, in Step S305 in FIG. 8, the order-of-priority controlling unit 209 assigns, as the order of priority of the policy information "e," an order of priority of "3" that is lower than those of pieces of policy information whose remote address settings are single address specifications among the already registered pieces of policy information. In addition, in Step S306, the order-of-priority controlling unit 209 lowers by one the order of priority of each of the pieces of policy information "c" and "d" having an order of priority that is the same as or lower than 3. Then, when the registering of the policy information in Step S308 is completed, the policy information list becomes as shown in FIG. 10.

The pieces of policy information such as those shown in FIG. 9 are already registered in the policy information list in RAM 102. The case in which policy information having the following content is registered will be described.

Policy Name: "f"
Local Address Setting: "all IP addresses"
Local Port Setting: "515"
Remote Address Setting: "all IP addresses"
Remote Port Setting: "all ports"
Common Key Setting: "ccc"

In this case, in Step 304 in FIG. 8, the order-of-priority controlling unit 209 refers to the order of priority of the pieces of policy information registered in the policy information list, and determines the order of priority of the input policy information so that it is lower than those of the pieces of policy information registered in the policy information list. More specifically, as the order of priority of the policy "f," the order-of-priority controlling unit 209 assigns an order of priority of "5" that is lower than the order of priority of the already registered pieces of policy information.

As described above, in the embodiment, when the policy information is newly registered or is edited, control is performed as follows. The policy information whose remote address setting is a single address specification is registered so that its order of priority is higher than that of the already registered pieces of policy information in which a plurality of addresses are specified. In addition, the policy information whose remote address setting is one in which a plurality of addresses are set is registered so that at least its order of priority is lower that those of the pieces of policy information in which a single address is specified in the remote address setting among the already registered pieces of policy information. By this, regardless of whether policy information in which a single address is specified exists, without burdening the user, it is possible to prevent an unsuccessful communication occurring when an attempt is made to perform communication using common key information registered in association with the pieces of policy information in which a plurality of addresses are specified.

In the embodiment, when the address of input policy information includes a single address, Step S305 is performed, whereas, when a plurality of addresses are set, Step S304 is performed. However, the following control may be performed. In Step S303, even if the input determining unit 207 determines that the input policy information has a plurality of addresses, the order-of-priority controlling unit 209 is requested by the input determining unit 207 to determine the order of priority of the input policy information. The order-of-priority controlling unit 209 determines whether or not the address of the input policy information is included in any of the addresses of the pieces of policy information included in the policy information list already registered in RAM 102. When the order-of-priority controlling unit 209 determines that the address is included, the process proceeds to Step S305. When the order-of-priority controlling unit 209 determines that the address is not included, the process proceeds to step S304 to perform the aforementioned control. When the process proceeds to Step S305, the order-of-priority controlling unit 209 restricts the registering of the policy information so that the order of priority of the input policy information is lower than the order of priority of the policy information whose address includes the remote address of the input policy information. Accordingly, when the policy information in which a plurality of addresses are specified is included in an address of a different piece of policy information, without burdening the user, it is possible to prevent an unsuccessful communication occurring when an attempt is made to perform communication using a common key registered in association with the different policy information.

Second Embodiment

In the embodiment, control that is performed when an already registered piece of policy information in which a plurality of addresses are specified differs from a common key in the case where an attempt is made to register policy information in which the remote address setting is a plurality-of-addresses specification (other than a single address specification) will be described.

In this case, when a common key of policy information input by a user from the operating unit 109 does not match the common key of the policy information already registered in RAM 102 and having a plurality of addresses specified, the control is performed so that their common keys match. By such control, it is possible to prevent, for example, unsuccessful communication occurring in a policy information list shown in FIG. 25.

Figure 11A:
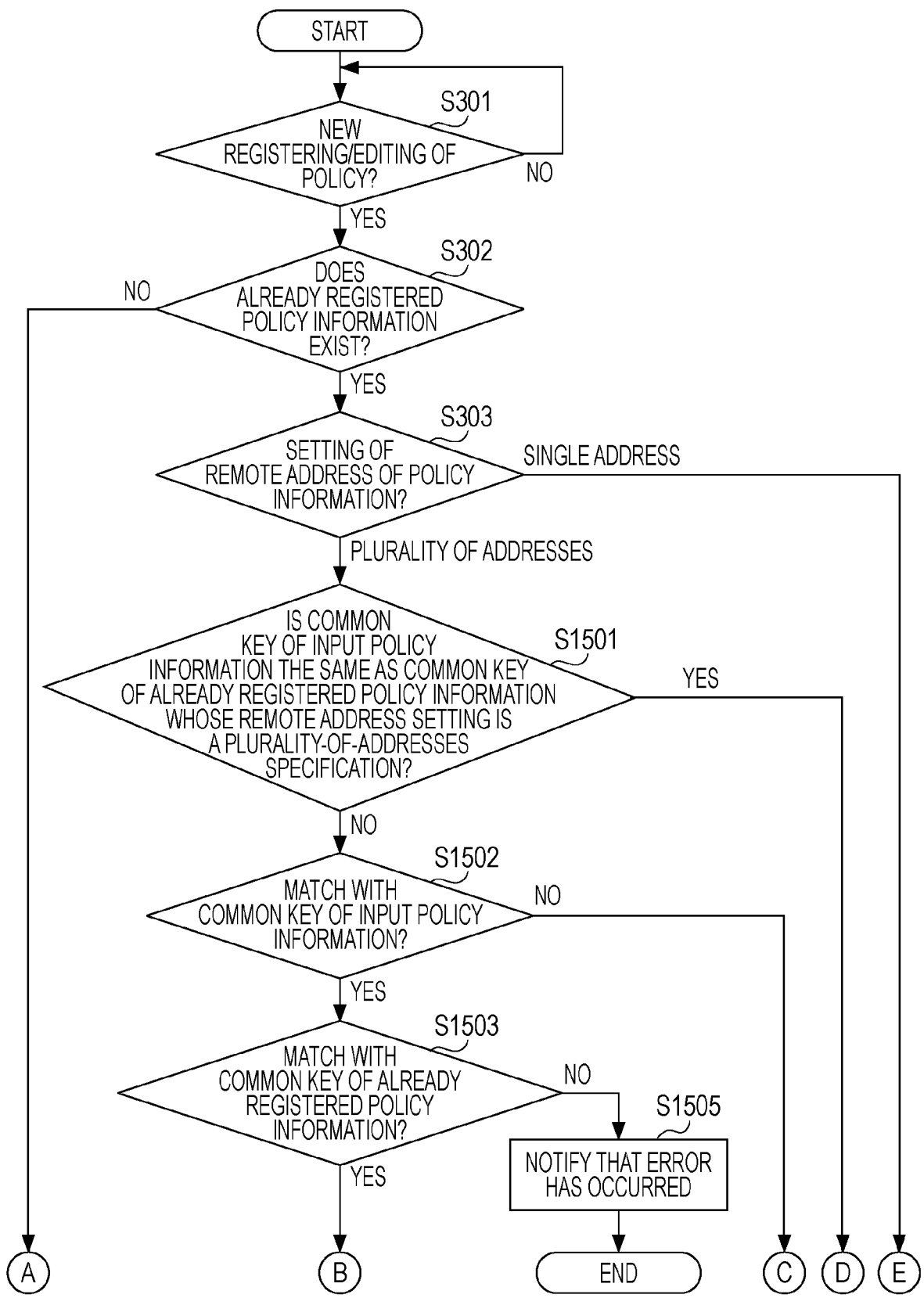
FIG. 11A is a flowchart according to a second embodiment of the present invention.
Figure 11B:
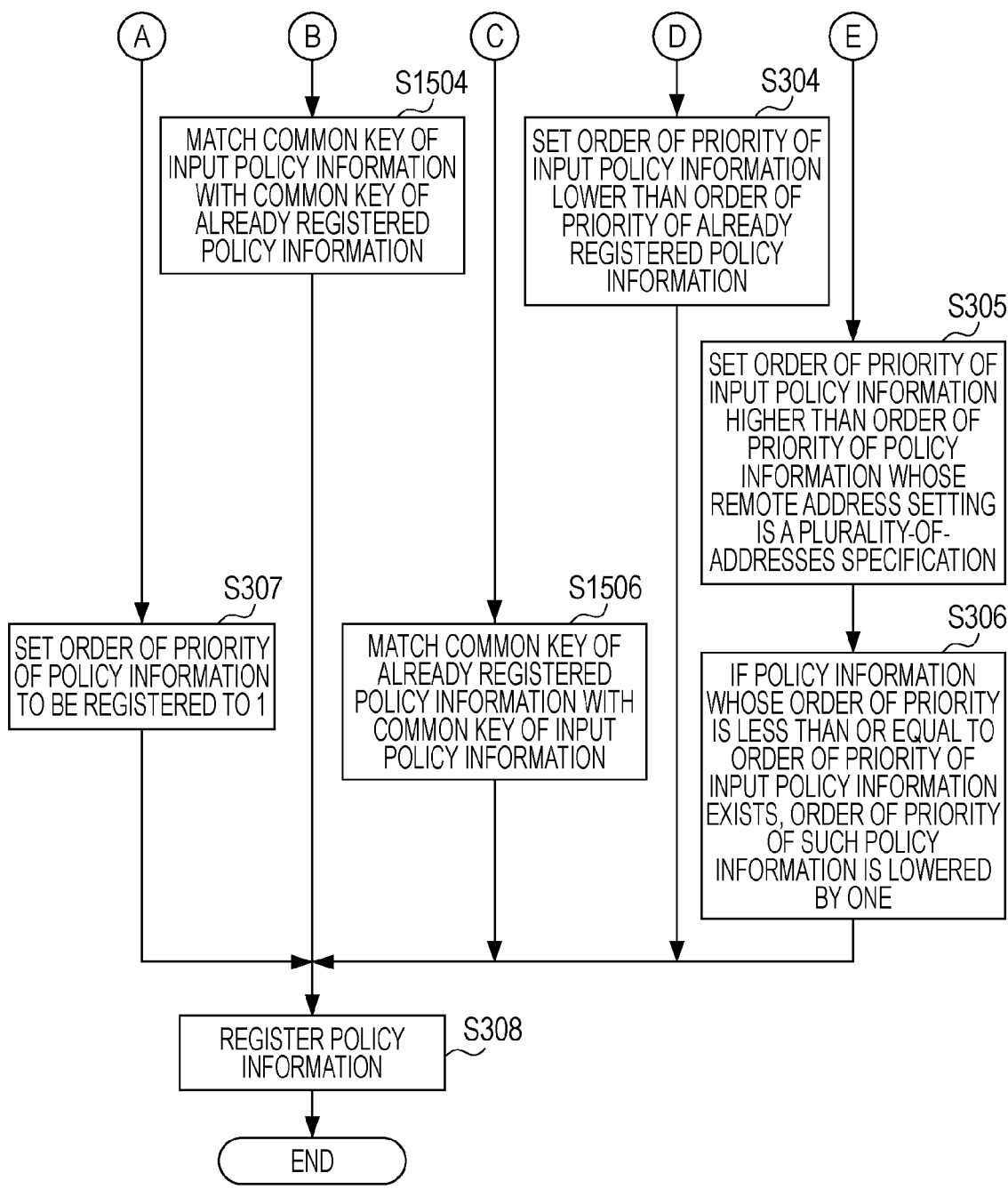
FIG. 11B is a flowchart according to the second embodiment of the present invention.

FIGS. 11A and 11B constitute is a flowchart showing the control procedure according to the second embodiment. The steps in the flowchart shown in FIGS. 11A and 11B are performed when the CPU 101 executes a program stored in ROM 102, and causes the various portions of the structure of the software shown in FIG. 2 to function. The steps corresponding to those shown in FIGS. 11A and 11B are given the same reference numerals, and will not be described in detail below.

In Step S303, when the input determining unit 207 determines that the remote address setting of the input policy information is a plurality-of-addresses specification, the process proceeds to Step S1501.

In Step S1501, the input determining unit 207 determines whether or not the setting of the common key of the input policy information is the same as the common key of any piece of policy information registered in RAM 102 and having a plurality of addresses specified in the remote address setting. When the input determining unit 207 determines that they are the same, the process proceeds to Step S304. In contrast, when the input determining unit 207 determines that they are not the same, the process proceeds to Step S1502. In Step S1501, the input determining unit 207 determines whether or not, among the pieces of policy information stored in RAM 102, the common key of any policy information whose address overlaps an address range (specified to the remote address setting of the input policy information) is the same. Here, it is determined whether the common key of any policy information, excluding the policy information in which a single address is specified, among the pieces of information having overlapping addresses is the same.

Figure 12:
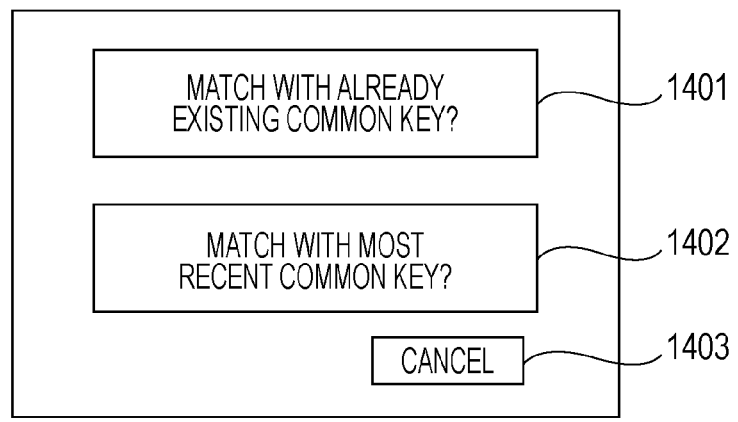
FIG. 12 illustrates an exemplary display screen according to the present invention.

In Step S1502, the interface unit 206 is requested by the input determining unit 207 to perform screen-display as shown in FIG. 12. The user interface unit 206 causes the operating unit 109 to perform screen-display as shown in FIG. 12, and causes the user to select the operation of causing the common key of the policy information to match the common key of the policy information registered in RAM 102, or the operation of causing the common key of the policy information to match the common key of the input policy information. When the user interface unit 109 receives the selection of the user, it issues an instruction for matching the control keys to the common key controlling unit 210 in accordance with the selection of the user. In Step S1502, the user interface unit 109 determines whether or not the user selects the operation of causing the common key of the policy information registered in RAM 102 to match the common key of the input policy information. When the user interface unit 109 determines that this operation is selected, the process proceeds to Step S1506. The case in which "match-with-most-recent-common-key" button 1402 shown in FIG. 12 is pressed corresponds to this. In Step S1506, the common key controlling unit 210 causes the common key of the policy information registered in RAM 102 through the main controlling unit 202 to match the common key of the input policy information. Then, in Step S306, the policy registering unit 208 registers the input policy information. Even in this case, the input policy information is registered so that its order of priority is set lower than the order of priority of the already registered policy information.

In contrast, in Step S1502, when the user interface unit 109 determines that the common key of the policy information registered in RAM 102 is not to be matched with the common key of the input policy information, the process proceeds to Step S1503.

In Step S1503, the user interface unit 109 determines whether or not the common key of the input policy information is to be matched with the common key of the policy information registered in RAM 102. If it determines that the common key of the input policy information is to be matched, the process proceeds to Step S1504. The case in which "match-with-already-existing-common-key" button 1401 shown in FIG. 12 is pressed corresponds to this. In Step S1504, the common key controlling unit 210 causes the common key of the input policy information to match the common key of the policy information registered in RAM 102. Then, in Step S306, the policy registering unit 208 registers the input policy information. Even in this case, the input policy information is registered so that its order of priority is set lower than the order of priority of the already registered policy information.

In Step S1503, when the user interface unit 109 determines that the operation of causing the common key of the input policy information to match the common key of the policy information registered in RAM 102 is not selected, the process proceeds to Step S1505. For example, in the display screen shown in FIG. 12, the case in which a cancel button 1403 is selected corresponds to this.

For example, it is assumed that pieces of policy information such as those shown in FIG. 13 are already registered in the policy information list in RAM 102. The case in which policy information having the following content is registered in the policy information list will be described.

Policy Name: "e"
Local Address Setting: "all IP addresses"
Local Port Setting: "515"
Remote Address Setting: "all IP addresses"
Remote Port Setting: "all ports"
Common Key Setting: "eee"

In this case, in Step S1501 shown in FIGS. 11A and 11B, the input determining unit 207 compares the common key "eee" of the input policy information with the common keys of the pieces of policy information registered in the policy information list stored in RAM 102 and having a plurality of addresses specified in the remote address setting. In the policy information list registered in RAM 102, the pieces of policy information in which a plurality of addresses are specified are policy information "c" and policy information "d." The common keys thereof are "ccc." Therefore, they do not match "eee." Consequently, the process proceeds to Step S1502, and the user interface unit 206 is requested by the input determining unit 207 to cause the operating unit 109 to perform screen-display as shown in FIG. 12.

When the "match-with-already-existing-common-key" button 1401 is pressed by the user through the screen display of the operating unit 109, the common key controlling unit 210 causes the common key "eee" of the input policy information to match the common key "ccc" of the pieces of policy information registered in RAM 102. When the registering of the policy information in Step S308 is completed, the policy list shown in FIG. 14 is set. (Operations from Steps S1502 to S1503 to S1504 to S308)

When the "match-with-most-recent-common-key" button 1402 is pressed by the user through the screen display of the operating unit 109, the common key controlling unit 210 performs the following control. The common key controlling unit 210 causes the common key "ccc" of the policy information "c" and policy information "d" registered in RAM 102 to match the common key "eee" of the input policy information. When the registering of the policy information in Step S308 is completed, the policy list shown in FIG. 15 is set. (Operations from Steps S1502 to S1506 to S308)

As the order of priority of the policy information "e," the order-of-priority controlling unit 209 assigns an order of priority of "3" that is lower than the order of priority of the pieces of policy information in which a single address is specified in the remote address setting among the already registered pieces of policy information. In addition, in Step S306, the order-of-priority controlling unit 209 lowers the order of priority of each of the policy information "c" and the policy information "d" by one. As a result, when the registering of the policy information is completed in Step S308, the policy information list shown in FIG. 10 is set.

When, as shown in FIG. 15, the common key of any already existing pieces of policy information is to be changed, the main controlling unit 202 may notify, for example, a network administrator that any common key is changed through the LAN 111. For example, when the common key of any already existing policy information is changed, the main controlling unit 202 transmits the changed policy information to a previously registered external computer or apparatus of a communication partner corresponding to the remote address of the policy information whose common key is changed. This allows a user using the apparatus of the communication partner whose address is specified in the remote address setting to easily know that the common key is changed. In addition, it is possible to perform control to cause the apparatus of the communication partner to change the common key registered in the policy information used for communication with the MFP. The main controlling unit 202 may perform the following control. That is, the main controlling unit may make a request to the user interface unit 206 so that the user interface unit 206 causes the operating unit 109 to display a predetermined time indicating that "the policy information has been changed," and to stop the display when the user presses, for example, a confirmation button (not shown).

By the above-described control, when an attempt is made to register policy information in which a plurality of addresses (other than a signal address) are set in the remote address setting, even if its common key differs from the common keys of the already registered pieces of policy information in which a plurality of addresses are specified, the policy information can be properly registered. By this, when there are a plurality of pieces of policy information that are registered in the policy information list and that have a plurality of addresses (other than a single address) specified in the remote address setting, it is possible to prevent unsuccessful communication occurring when the settings of the common keys thereof differ from each other.

Third Embodiment

In the embodiment, control that is performed when the order of priority of policy information registered in RAM 102 is changed will be described. When a user makes a request to change the order of priority of the policy information through the operating unit 109, it is possible prevent unsuccessful communication caused by the order of registration of a policy information list.

Figure 16:
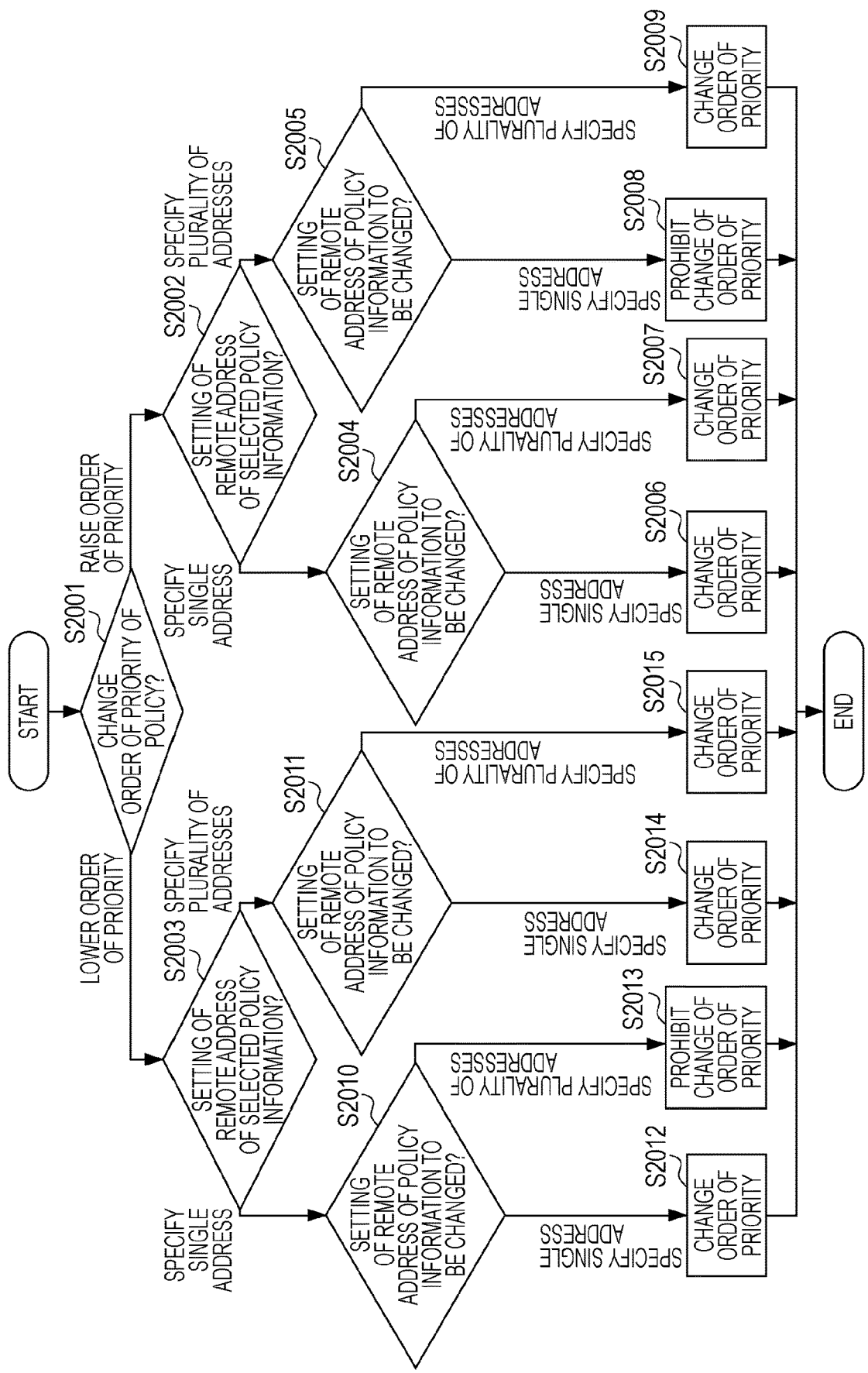
FIG. 16 is a flowchart according to a third embodiment of the present invention.

FIG. 16 is a flowchart showing the control procedure according to a third embodiment. The steps in the flowchart shown in FIG. 16 are performed when the CPU 101 executes a program stored in ROM 102, and causes the various portions of the structure of the software shown in FIG. 2 to function. The steps corresponding to those shown in FIG. 1 are given the same reference numerals, and will not be described in detail below.

If the user wants to change the order of priority of the already registered information, at the screen shown in FIG. 7, it is possible for the user to select a piece of predetermined policy information and to press either the "raise priority" button, or the "lower priority" button, to change the order of priority of the policy information.

First, in Step S2001, the user interface unit 206 transfers to the order-of-priority controlling unit 208 information regarding whether the "raise priority" button is pressed or the "lower priority" button is pressed. In Step S2001, when it is determined that the "lower priority" button is pressed, the process proceeds to Step S2003.

In Step S2003, the order-of-priority controlling unit 208 determines whether a single address or a plurality of addresses are specified in the remote address setting of the policy information selected by the user. When, in Step S2003, it determines that a single address is specified, the process proceeds to Step S2010. In Step S2010, the order-of-priority controlling unit 208 determines whether a single address or a plurality of addresses are specified in the remote address setting of the policy information for change. In this case, the order of priority of the policy information for change is lower by one order of priority. Therefore, the order-of-priority controlling unit 208 determines whether a single address or a plurality of addresses are specified in the remote address setting of the policy information whose order of priority is one order of priority lower than the order of priority of the policy information selected by the user. When, in Step S2010, a single address is specified, in Step S2012, through the main controlling unit 202, the order-of-priority controlling unit 208 lowers the order of priority of the policy information selected by the user by one order of priority, and raises the order of priority of the policy information for change by one order of priority. In contrast, when, in Step S2010, it determines that a plurality of addresses are specified, the order-of-priority controlling unit 208 performs control so that the order of priority is not changed in Step S2013. In Step S2013, the order-of-priority controlling unit 208 makes a request to the user interface unit 206 to cause the operating unit 109 to display a notification that the order of priority cannot be changed. The user interface unit 206 causes the notification to be displayed at the operating unit 109 as shown in a display example shown in FIG. 17. This makes it possible to notify the user that the order of priority cannot be changed.

When, in Step S2003, it is determined that a plurality of addresses are specified in the remote address setting of the policy information selected by the user, the process proceeds to Step S2011. In Step S2011, the order-of-priority controlling unit 208 determines whether or not a single address or a plurality of addresses are specified in the remote address setting of the policy information for change. When, in Step S2011, it is determined that a plurality of addresses are specified, through the main controlling unit 202, the order-of-priority controlling unit 208 lowers the order of priority of the policy information selected by the user by one order of priority, and raises the order of priority of the policy information for change by one order of priority. When, in Step S2011, it is determined that a single address is specified, in Step S2014, the order of priority can be changed as in Step S2015. However, for the control according to the first embodiment, policy information which has a single address specified and whose order of priority is lower than that of the policy information which has a plurality of addresses specified does not exist. Therefore, Step S2014 is not performed.

When, in Step S2001, it is determined that the "raise priority" button is pressed, the process proceeds to Step S2002. In Step S2002, the order-of-priority controlling unit 208 determines whether or not a single address or a plurality of addresses are specified in the remote address setting of the policy information selected by the user. When, in Step S2002, it is determined that a single address is specified, the process proceeds to Step S2004 in which the order-of-priority controlling unit 208 determines whether or not a single address or a plurality of addresses are specified in the remote address setting of the policy information for change. In this case, since the order of priority of the policy information for change is one order of priority higher, the order-of-priority controlling unit 208 determines whether a single address or a plurality of addresses are specified in the remote address setting of the policy information having an order of priority that is one order of priority higher than that of the policy information selected by the user. When, in Step S2004, the order-of-priority controlling unit 208 determines that a single address is specified, then, in Step S2006, through the main controlling unit 202, the order-of-priority controlling unit 208 raises the order of priority of the policy information selected by the user by one, and lowers the order of priority of the policy information for change by one. In contrast, when, in Step S2004, the order-of-priority controlling unit 208 determines that a plurality of addresses are specified, then, in Step S2007, the same changes in the order of priority carried out in Step S2006 are allowed to be performed. However, for the control according to the first embodiment, policy information which has a single address specified and whose order of priority is lower than that of the policy information which has a plurality of addresses specified does not exist. Therefore, Step S2007 is not performed.

When, in Step S2002, it is determined that a plurality of addresses are specified, then, in Step S2005, the order-of-priority controlling unit 208 determines whether or not a single address or a plurality of addresses are specified in the remote address setting of the policy information for change. When, in Step S2005, it is determined that a plurality of addresses are specified, then, in Step S2009, through the main controlling unit 208, the order-of-priority controlling unit 208 raises the order of priority of the policy information selected by the user by one order of priority, and lowers the order of priority of the policy information for change by one order of priority. In contrast, when, in Step S2005, it determines that a single address is specified, the order-of-priority controlling unit 208 performs control so that the order of priority is not changed. In Step S2013, the order-of-priority controlling unit 208 makes a request to the user interface unit 206 to cause the operating unit 109 to display a notification that the order of priority cannot be changed. The user interface unit 206 causes the notification to be displayed at the operating unit 109 as shown in the display example shown in FIG. 17. This makes it possible to notify the user that the order of priority cannot be changed.

FIG. 18 shows an exemplary policy information list registered in RAM 102 according to the present invention. It is assumed that, at the screen shown in FIG. 7, the user selects policy information "c," and presses the "lower priority" button. At this time, in Step S2015, the policy information list is changed to a policy information list provided after the change shown in FIG. 19.

Similarly, it is assumed that, from the state shown in FIG. 18, the user selects the policy information "c," and presses the "raise priority" button. At this time, in Step S2008, control is performed so that the order of priority of the policy information is not changed. At this time, a screen display, such as that shown in FIG. 17, is set. Similarly, it is assumed that, from the state shown in FIG. 18, the user selects policy information "b," and presses the "lower priority" button. At this time, in Step S2013, control is performed so that the policy information is not changed. Even at this time, a screen display, such as that shown in FIG. 17, is set.

The above-described first to third embodiments may be separately carried out, or may be arbitrarily combined.

In the above-described first to third embodiments, the case in which the pieces of policy information include common keys is described. However, instead of including the common keys, the pieces of policy information may include information for generating the common keys or information indicating the locations where common keys are stored. In the above-described first to third embodiments, the case in which the pieces of policy information include common keys is described. However, the control operations in the above-described first to third embodiments may be applied even if a column of the common keys of the pieces of policy information, such as those shown in FIG. 9, includes information that prescribes control procedures for communication. The information that prescribes the control procedures for the communication is, for example, restrictions for the communication and a packet filtering method.

With reference to a memory map shown in FIG. 25, the structure of a data processing program that can be read by the information processing apparatus according to the present invention will be described below.

FIG. 25 illustrates the memory map of a storage medium that stores various data processing programs that can be read by the information processing apparatus according to the present invention.

Although not particularly shown, information for controlling program groups stored in the storage medium, such as version information, and creator are stored. In addition, information depending upon, for example, an OS at a program readout side, such as icons that identify and display the programs, may also be stored.

Further, data depending upon the various programs is also controlled by the aforementioned directory. For example, a program for installing various programs in a computer or a program for an uncompressing operation when a program to be installed is compressed may also be stored.

The functions according to the embodiments may be executed by a host computer with a program that is installed from the outside. In this case, the present invention is applied even if an information group including a program is supplied to an output device from a storage medium, such as CD-ROM, a flash memory, or an FD, or a storage medium that can be read by an external computer through a network.

As described above, the storage medium in which program codes of software implement the functions according to the embodiments is supplied to a system or a device. It goes without saying that the object according to the present invention can be achieved even if the system or the device (computer) or CPU or MPU reads out the program codes stored in the storage medium and executes them.

In this case, the program codes, themselves, read out from the storage medium, implement new functions according to the present invention, so that the storage medium that stores the program codes constitute the present invention.

Therefore, as long as program functions are provided, the form of the programs may be, for example, an object code, a program executed by an interpreter, or script data supplied to an OS.

The storage medium for supplying the programs may be, for example, a flexible disc, a hard disc, an optical disc, a magneto-optical disc, MO, CD-ROM, CD-R, CD-RW, a magnetic tape, a nonvolatile memory card, ROM, or DVD.

In this case, the program codes, themselves, read out from the storage medium implement the functions according to the above-described embodiments. Accordingly, the storage medium that stores the program codes constitute the present invention.

The programs can be supplied as follows. For example, the programs can be supplied by connecting to a homepage on the internet using a browser of client computers 106 and 107, and downloading a computer program according to the present invention from the homepage to a recording medium such as a hard disc. Alternatively, the programs can be supplied by downloading a compressed file including automatic install functions to a recording medium such as a hard disc. Still alternatively, the programs can be supplied by dividing the program codes of the program according to the present invention into a plurality files and downloading the files from different homepages. That is, for example, a WWW server and an ftp server that causes program files for implementing the functional operations according to the present invention by a computer to be downloaded to a plurality of users are also included in the claims according to the present invention.

It is possible to encrypt the programs according to the present invention and store them in the storage medium, such as CD-ROM, and distribute them to the user. In addition, it is also possible to cause a user who has cleared predetermined conditions to download key information that undoes the encryption from a homepage through the internet, execute the encrypted programs by using the key information, installing the programs in a computer, and implementing them.

The present invention is not limited to the case in which the functions according to the embodiments are implemented by executing the program codes read out by a computer. For example, it goes without saying that the functions according to the above-described embodiments can be implemented when, for example, an operating system (OS) operating at the computer executes some or all of the actual operations on the basis of program code instructions.

Further, it is possible to perform control on the basis of a program code instruction after writing the program codes read out from the storage medium to a memory including a function expansion unit connected to a computer or a function expansion board inserted in the computer. For example, it goes without saying that the case in which the functions according to the embodiments are implemented when, for example, a CPU including the function expansion board or the function expansion unit performs some or all of the actual operations.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

The invention claimed is:

1. An information processing apparatus configured to communicate with at least one communication apparatus comprising:

one or more memories which store instructions,
one or more processors which execute instructions to:
input a first policy which defines a first encryption key configured to be used in communication with plural communication apparatuses and a second policy which defines a second encryption key configured to be used in communication between the information processing apparatus and a single communication apparatus;
automatically select the second encryption key for encrypting communication between the information processing apparatus and the single communication apparatus and not selecting the first encryption key in a case where the second policy corresponding to an address of a communication partner exists, even if the address of the communication partner is included in a range of addresses of the plural communication apparatuses defined by the first policy;
communicate by transmitting encrypted data with the selected second encryption key; and
change an order of priority of existing policy automatic selection, upon receiving a user instruction for changing an order of priority for one policy selected from a policy list which contains a plurality of first policies and a plurality of second policies and in which an order of priority of policy automatic selection is defined, and
prohibit the order of priority of policy automatic selection from being changed, in a case where a user instruction for changing the order of priority to give a higher order of priority to the first policy than the second policy is received and in a case where a user instruction for changing the order of priority to give a lower order of priority to the second policy than the first policy is received.

2. The information processing apparatus according to claim 1, wherein the first encryption and the second encryption key are encryption keys for encryption communication complainant with IP/Sec communication.

3. The information processing apparatus according to claim 1, wherein an expression of addresses includes at least a starting address and an ending address to designate a range of addresses which plural communication apparatuses have.

4. The information processing apparatus according to claim 1, wherein the information processing apparatus includes a printer.

5. The information processing apparatus according claim 4, wherein the first policy and the second policy are input via an operation panel and/or network interface.

6. An information processing method comprising:
inputting a first policy which defines a first encryption key configured to be used in communication with plural communication apparatuses and a second policy which defines a second encryption key configured to be used in communication between the information processing apparatus and a single communication apparatus;
automatically selecting the second encryption key for encrypting communication between the information processing apparatus and the single communication apparatus and not selecting the first encryption key in a case where the second policy corresponding to an address of a communication partner exists, even if the address of the communication partner is included in a range of addresses of the plural communication apparatuses defined by the first policy;
communicating by transmitting encrypted data with the selected second encryption key; and changing an order of priority of existing policy automatic selection, upon receiving a user instruction for changing an order of priority for one policy selected from a policy list which contains a plurality of first policies and a plurality of second policies and in which an order of priority of policy automatic selection is defined, and prohibiting the order of priority of policy automatic selection from being changed, in a case where a user instruction for changing the order of priority to give a higher order of priority to the first policy than the second policy is received and in a case where a user instruction for changing the order of priority to give a lower order of priority to the second policy than the first policy is received.

7. The information processing method according to claim 6, wherein the first encryption and the second encryption key are encryption keys for encryption communication complainant with IP/Sec communication.

8. The information processing method according to claim 6, wherein an expression of addresses includes at least a starting address and an ending address to designate a range of addresses which plural communication apparatuses have.

9. The information processing method according to claim 6, wherein the information processing apparatus includes a printer.

10. The information processing method according claim 9, wherein the first policy and the second policy are input via an operation panel and/or network interface.

11. A non-transitory computer readable storage medium storing a computer-executable program of instructions for causing a computer to perform an information processing method comprising:

inputting a first policy which defines a first encryption key configured to be used in communication with plural communication apparatuses and a second policy which defines a second encryption key configured to be used in communication between the information processing apparatus and a single communication apparatus;

automatically selecting the second encryption key for encrypting communication between the information processing apparatus and the single communication apparatus and not selecting the first encryption key in a case where the second policy corresponding to an address of a communication partner exists, even if the address of the communication partner is included in a range of addresses of the plural communication apparatuses defined by the first policy;

communicating by transmitting encrypted data with the selected second encryption key; and changing an order of priority of existing policy automatic selection, upon receiving a user instruction for changing an order of priority for one policy selected from a policy list which contains a plurality of first policies and a plurality of second policies and in which an order of priority of policy automatic selection is defined, and prohibiting the order of priority of policy automatic selection from being changed, in a case where a user instruction for changing the order of priority to give a higher order of priority to the first policy than the second policy is received and in a case where a user instruction for changing the order of priority to give a lower order of priority to the second policy than the first policy is received.

12. The non-transitory computer readable storage medium according to claim 11, wherein the first encryption and the second encryption key are encryption keys for encryption communication complainant with IP/Sec communication.

13. The non-transitory computer readable storage medium according to claim 11, wherein an expression of addresses includes at least a starting address and an ending address to designate a range of addresses which plural communication apparatuses have.

14. The non-transitory computer readable storage medium according to claim 11, wherein the information processing apparatus includes a printer.

15. The non-transitory computer readable storage medium according claim 14, wherein the first policy and the second policy are input via an operation panel and/or network interface.

* * * * *